Aug. 27, 1968   E. R. ADAMS ET AL   3,398,904
FILTER CARTRIDGE WINDING APPARATUS
Filed Aug. 5, 1966   5 Sheets-Sheet 5
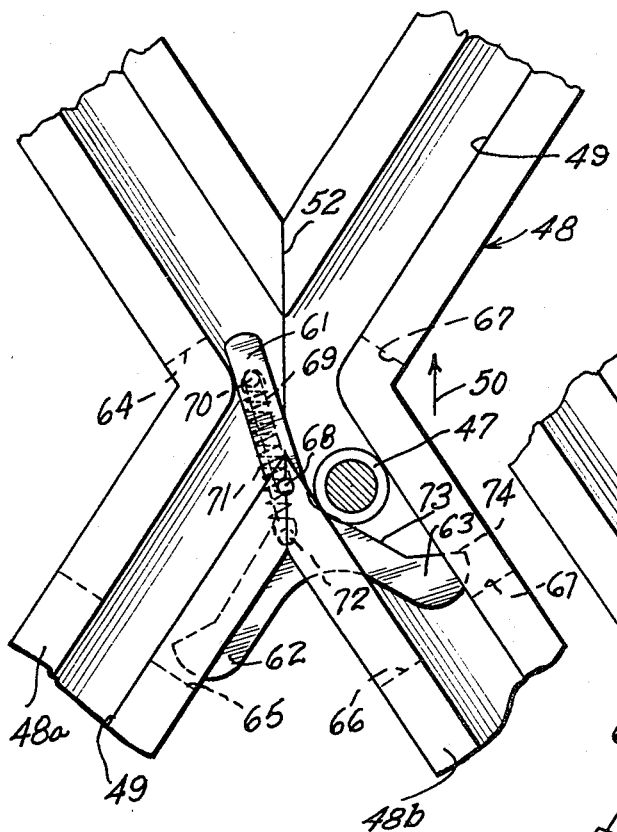
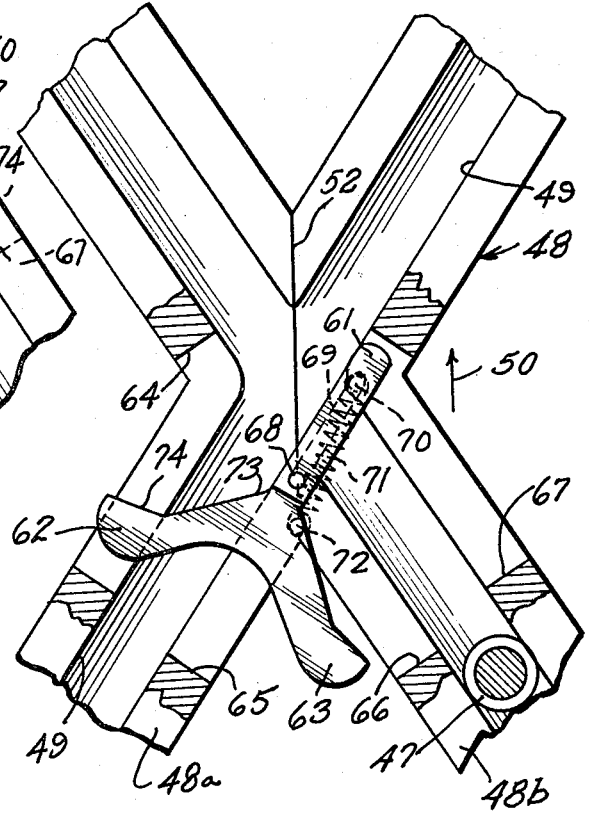
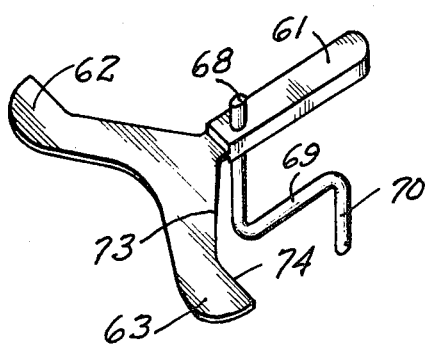
INVENTORS
Edward R. Adams
Jim L. Shepherd
BY Hill, Sherman, Meroni, Gross & Simpson
ATTORNEYS

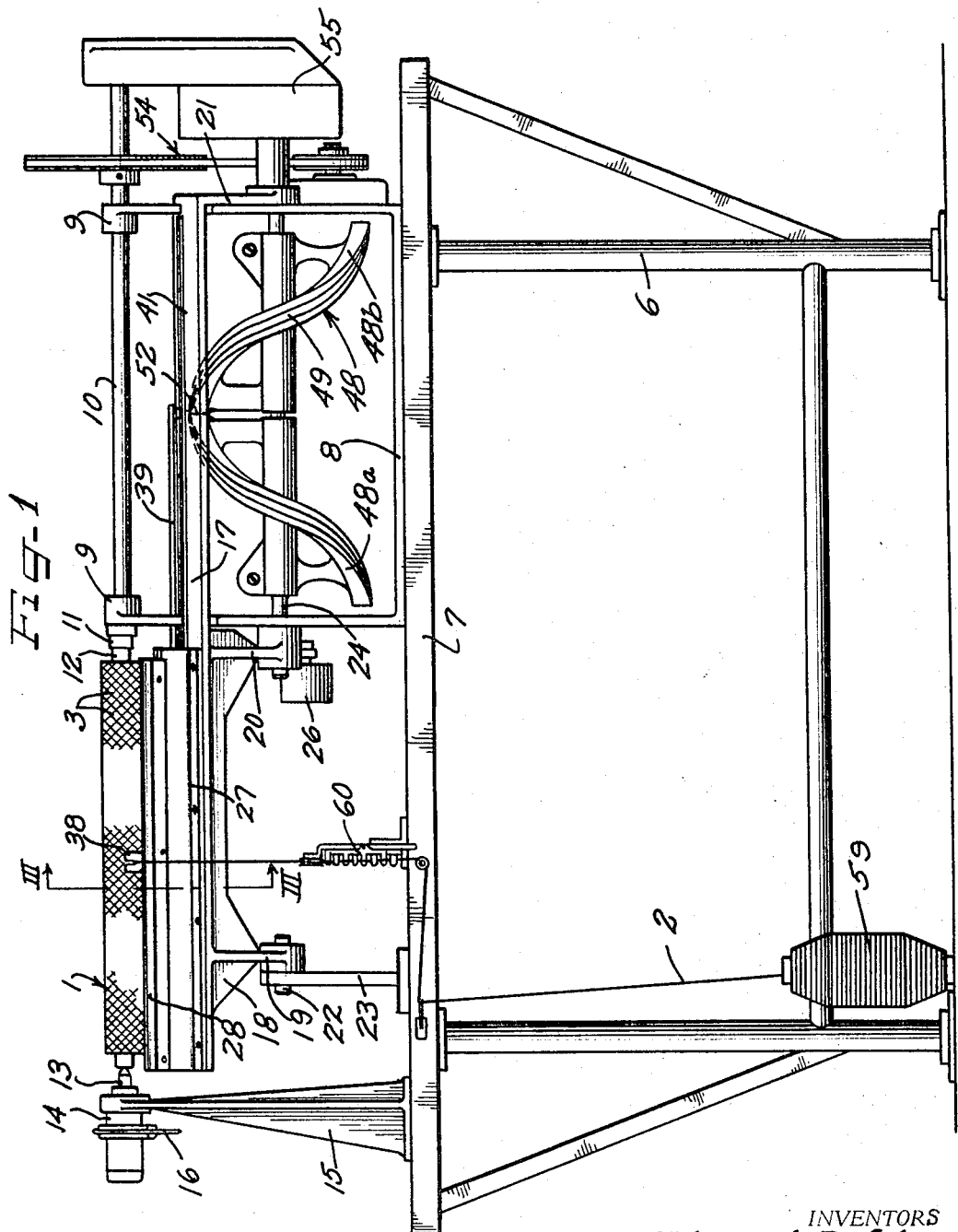

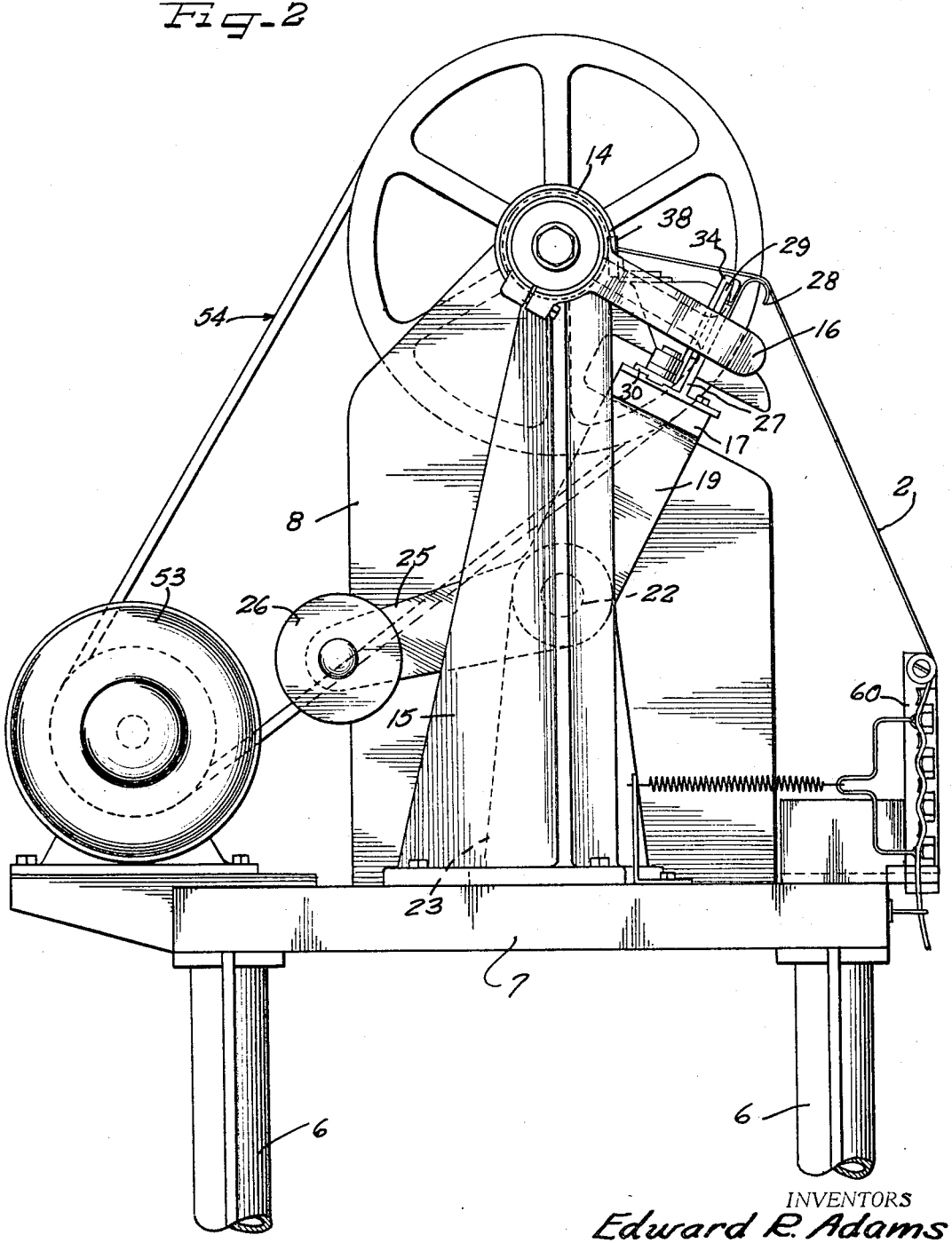

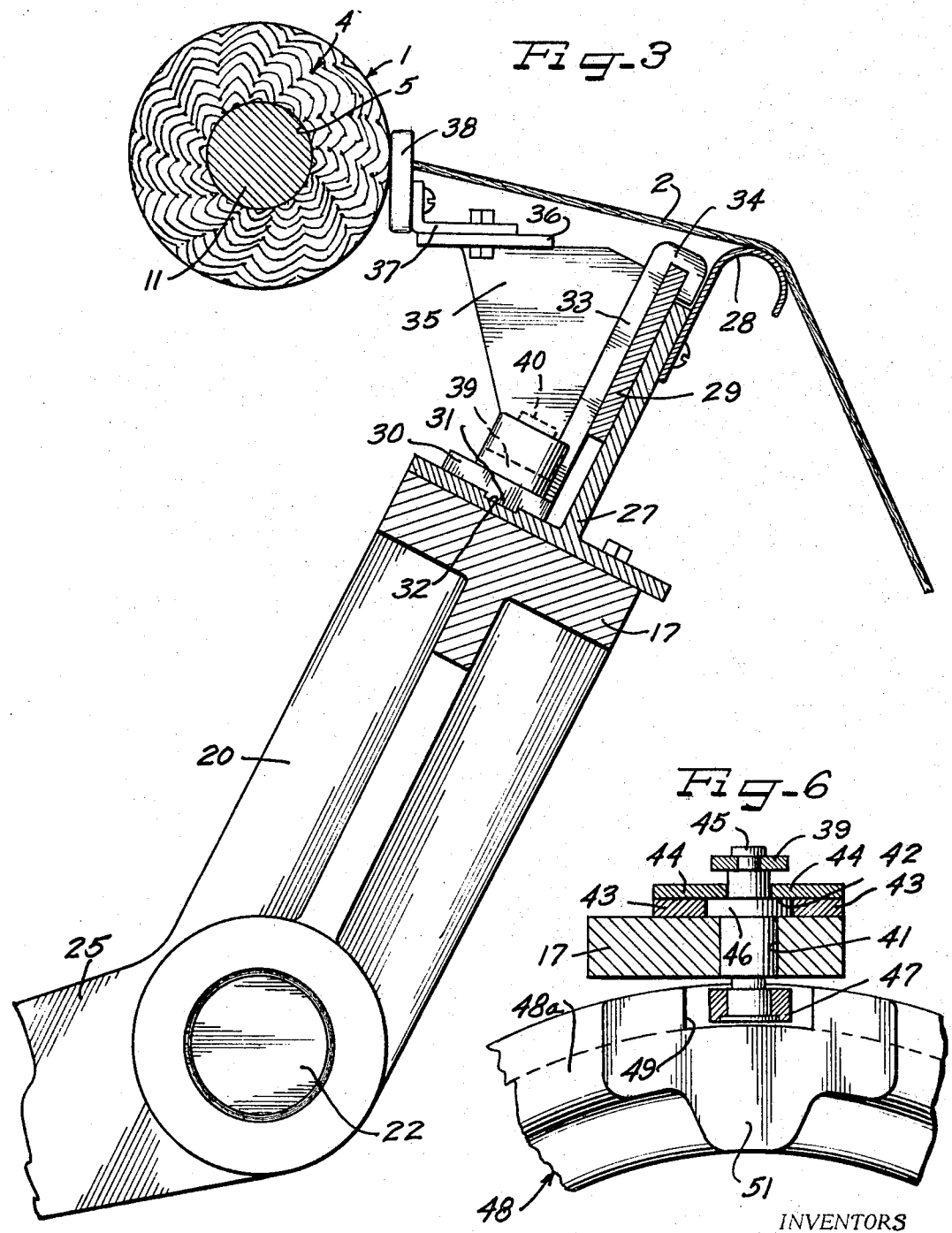

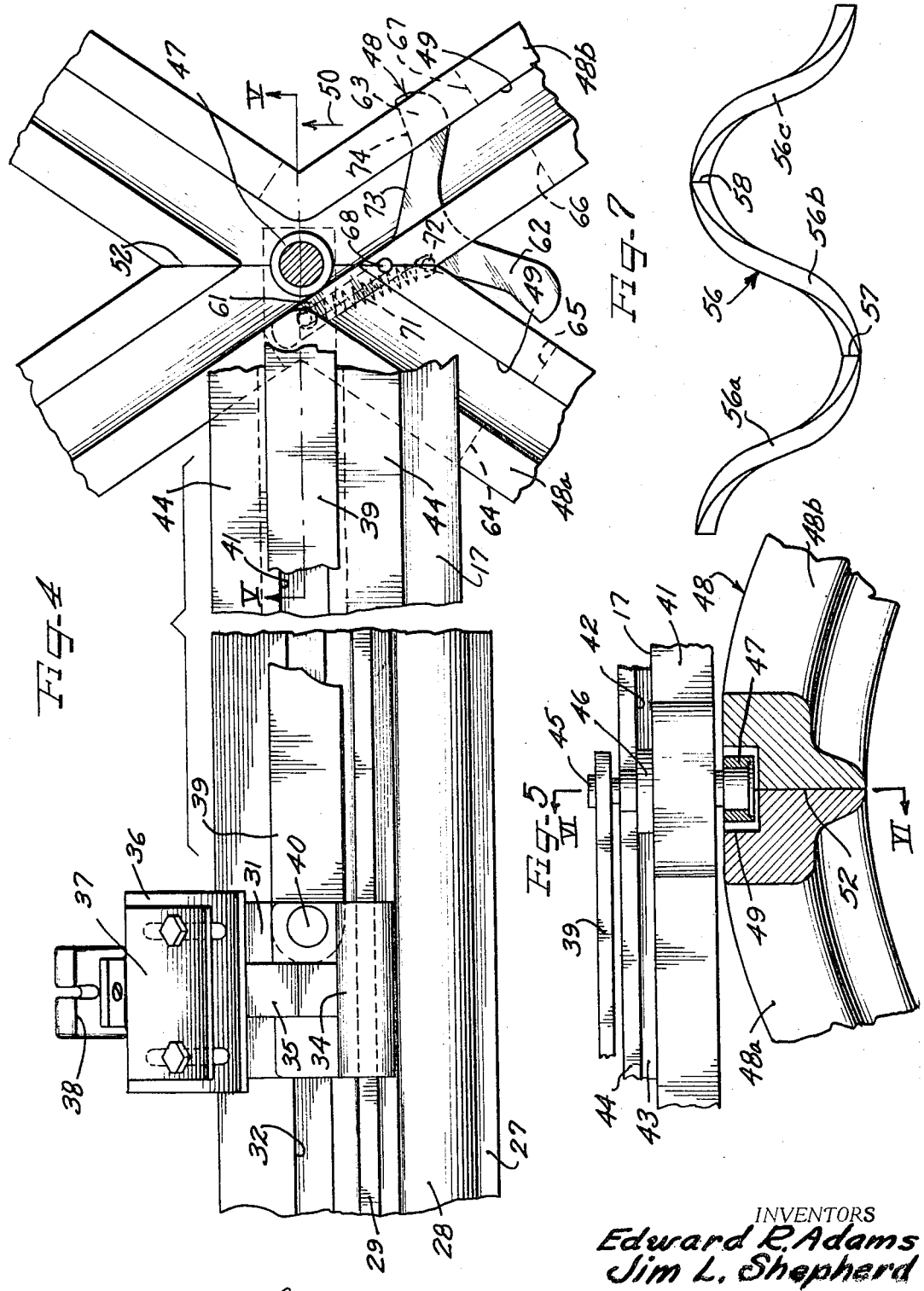

United States Patent Office 3,398,904
Patented Aug. 27, 1968

3,398,904
FILTER CARTRIDGE WINDING APPARATUS
Edward R. Adams and Jim L. Shepherd, Lebanon, Ind.,
assignors to Commercial Filters Corporation, Lebanon,
Ind., a corporation of New York
Filed Aug. 5, 1966, Ser. No. 570,497
3 Claims. (Cl. 242—18)

ABSTRACT OF THE DISCLOSURE

Apparatus for uniform filter cartridge winding is provided which comprises spaced upright supports, a rotatable winding mandrel between two of said supports, an elongated pivotal counter balance guide bar spanning the supports, a winding guide on said guide bar, a helical continuous barrel cam having a track with a cross-over intersection guarded by a pivotal cam gate guided in slots in the track side walls, a rider slidably mounted on said guide bar and having one end connected to said guide and the other end riding in the track so that as said barrel cam rotates the guide is reciprocally moved along the length of said winding mandrel whereby uniform winding of the cartridge is provided. Said barrel cam is fabricated of uniform sectional elements. The pivotal gate extends substantially the full depth of the track in the slots so that a continuous and smooth lateral support by the track of the rider is provided.

---

This invention relates to improvements in a filter cartridge winding apparatus and more particularly to apparatus for making a filter tube comprising helically wound layers of fibrous or fuzzy yarn or roving, although the apparatus may have other uses and purposes as will be apparent to one skilled in the art.

Heretofore, filter cartridges in the form of a tube comprising helically wound roving were usually made approximately 10 inches in length, owing to the capacity of the winding machines. While such tubes in many cases were of sufficient length, in other instances they were far too short, and in some installations requiring a total of 20 tubes 30 inches in length, it would be necessary to utilize 60 of the 10 inch tubes, mounted in stacks of three one upon the other. It was therefore necessary to provide adequate sealing means between confronting tube ends into each stack, and when tubes had to be removed or replaced, it was an objectionably burdensome and time consuming operation.

With the foregoing in mind, it is an important object of the instant invention to provide apparatus for making a filter tube of helically wound roving of considerably greater length than was made heretofore, the tube being of uniform diameter without bulges, whereby the danger of leakage between joints of stacked tubes is completely eliminated and the labor involved in removing and replacing tubes is reduced to a minimum.

While some of the more salient features, characteristics and advantages of the instant invention have been above pointed out, others will become apparent from the following disclosures, taken in conjunction with the accompanying drawings, in which:

FIGURE 1 is an elevational view of a machine or apparatus for making filter cartridges, embodying improvements of the instant invention;

FIGURE 2 is a fragmentary enlarged end elevational view of the structure of FIGURE 1, taken from the left hand end of FIGURE 1;

FIGURE 3 is a greatly enlarged fragmentary vertical sectional view taken substantially as indicated by the line III—III of FIGURE 1, looking in the direction of the arrows;

FIGURE 4 is an enlarged fragmentary plan view of the structure of FIGURE 1, with parts broken away and parts omitted to better disclose the structure therebeneath;

FIGURE 5 is a fragmentary vertical sectional view taken substantially as indicated by the line V—V of FIGURE 4;

FIGURE 6 is a fragmentary vertical sectional view taken substantially as indicated by the line VI—VI of FIGURE 5;

FIGURE 7 is a diagrammatic view illustrating how the machine may be adjusted to make longer tubes than are made with the arrangement of FIGURE 1;

FIGURE 8 is a fragmentary view of the right-hand portion of FIGURE 4, but showing the parts in a slightly advanced state of relative movement;

FIGURE 9 is a view similar to FIGURE 8 but showing the parts in a still further advanced state of relative movement; and FIGURE 10 is a perspective view of a cam gate utilized in the instant invention.

The filter cartridge made by the instant invention is seen in FIGURES 1 and 3, and is in the form of a porous tubular element, generally indicated by numeral 1, and which consists entirely of a fibrous yarn or roving wound in successive layers of spaced helical convolutions alternating in direction to provide a crisscrossed pattern. The general structure of the element 1 and the winding thereof is more fully set forth and described in Maurice A. Goldman U.S. Letters Patent No. 1,958,268, issued May 8, 1934.

The filter element 1 may be formed from a fuzzy or fibrous yarn 2 of cotton fibers, viscous rayon, cellulose acetate, or other synthetic fiber, the yarn resembling a rove. The crisscross winding results in the provision of substantially diamond-shaped openings 3 between successive layers which gradually increase in size with the increase in diameter of the element being wound, and the crossing points of the convolutions are moved slightly as to circumferential position during the winding. In this manner, curvate tunnels, generally indicated by numeral 4, are provided in the element through which the fluid being filtered passes. Before or during the winding of the yarn 2, the yarn is napped by any suitable napping mechanism, not shown, to provide fine fibers extending across the tunnels or passages 4, there being a myriad of such fibers across each passage. By way of example, a filter element substantially 20 inches long, 2½ inches in diameter, with an unrestricted passage 5 lengthwise therethrough of approximately 1 inch in diameter, may have 600 or more of such passages 4.

The winding machine embodies suitable supporting means such as a table comprising uprights or legs 6 carrying a bed 7 upon which the winding equipment is mounted. Mounted on the bed 7 is a generally U-shaped frame 8, the upstanding legs of which are each provided with a bearing 9 at the top thereof. A shaft 10 is journalled in the bearings 9—9 and on one end thereof the shaft carries a chuck 11 or equivalent means for removably engaging and supporting an end of a mandrel 12. The opposite end of the mandrel is removably engaged and supported by a rotary spindle 13 carried in a chuck or the equivalent 14 mounted on a support 15 and controlled by means of a hand lever 16.

Extending across the front side of the machine is an elongated bar 17, this bar having a depending web-shaped portion 18 in that portion thereof disposed beneath the mandrel 12, and the bar having three separate depending supports 19, 20 and 21. The support 19 is pivoted about a pin 22 carried in an upright 23. The supports 20 and 21 are similarly pivoted about portions of a shaft 24 extending through the legs of the frame 8, and the shaft is rotatable relatively to the supports 20 and 21. As seen best in FIGURE 2, the support 20 is angular and pivoted at its elbow with a leg 25 extending rearwardly and carrying an adjustable counterweight 26 thereon, this counterweight constantly urging the bar 17 toward the axis of the mandrel 12.

On that portion of the bar 17 adjacent the mandrel 12, an inverted T-shaped angle bar 27 is mounted in any suitable manner, as seen more clearly in FIGURE 3. On the front face of the upper flange of the bar 27 an elongated curvate strip 28 is secured, over the rounded portion of which the roving 2 may pass without danger of snagging. Secured to the inner face of that same upstanding flange is a traverse bar 29 which projects above the flange of the bar 27 a sufficient distance to function as a track. A roving guide assembly travels along the inverted T-bar 27 and the traverse bar 29. This assembly includes a base member 30 having a depending lug 31 on the bottom thereof which rides in a groove 32 extending lengthwise of the base of the T-bar 27. Upstanding from the base 30 and secured thereto is a link 33 having a retroverted upper end 34 to engage over the traverse bar as clearly seen in FIGURE 3. Extending rearwardly from the member 33 is a supporting web 35 which carries a plate 36 to which an angle member 37 is adjustably secured, the angle member in turn carrying a notched roving guide 38. An elongated connecting rod 39, secured to the roving guide assembly as indicated at 40 moves the roving guide backward and forward over the full length of the filter element 1 being wound.

In the region of movement of the other end of the connecting rod 39, beneath the aforesaid drive shaft 10, the bar 17 is provided with a slot 41 extending therealong and above this slot an inverted T-shaped track or passage is provided 42 by means of a pair of opposed strips 43—43 secured to the top face of the bar 17 and a pair of spaced wider strips 44—44 mounted on the top of the strips 43—43. Pivotally connected to the end of the connecting rod 39 and depending therefrom is a stud 45. As seen best in FIGURE 6 this stud is provided with a flange 46 thereon of greater diameter than the major portion of the stud which flange rides between the strips 43—43 and underneath the inner margins of the strips 44—44 in the aforesaid track 42. The stud depends downwardly through the slot 41 in the bar 17 and carries on its lower end a rotary cam rider 47.

To reciprocate the connecting rod 39, a multiple-unit helical barrel cam, generally indicated by numeral 48, is provided on the aforesaid shaft 24. The cam shown in FIGURES 1, 4 and 5 embodies two units which for the purpose of clarity will be designated units 48a and 48b although the units are so joined that the total cam 48 is one integral structure. As this cam 48 is viewed in FIGURE 1, the rear portion of the cam is of the same general contour as the visible portion and is directly therebehind, as is evinced by the showing in FIGURE 4. The cam is provided with a groove cam track 49 in which the aforesaid follower 47 is disposed. While the cam rotates, it acts upon the follower so as to reciprocate the connecting rod 39 and, as shown, two revolutions of the cam are required to move the connecting rod and roving guide 38 through a complete cycle from one end of the filter element to the other and back.

With reference to FIGURE 4, it will be seen that the track 49 of the cam unit 48a intersects with the track 49 of the cam unit 48b at an acute angle. The point of intersection is where there would be a reversal in direction if only a single unit helical barrel cam were utilized. There is no change with the track at the intersection since the track portions of unit 48a are in direct alignment with the respective track portions of the unit 48b so that there is as a result a single somewhat figure-eight track throughout the entire cam. With the rider 47 on the point of intersection as seen in FIGURES 1 and 4, the roving guide will be in central position relatively to the filter element 1 being wound as seen in FIGURE 1. Assuming that the cam is being rotated in the direction of the arrow 50 of FIGURE 4 the rider 47 is, in effect, just entering the cam track in the section 48b. One revolution of the cam will leave the rider in the same position but in effect, just entering the cam track in the section 48a, and the roving guide 38 will have moved from the central position of FIGURE 1 to the right-hand end of the filter element and back to central position. Upon the next revolution of the cam the track of section 48a will reciprocate the roving guide to the left-hand end of the filter element and back to central position.

The multiple unit cam can easily be made from a pair of single unit helical barrel cams by cutting off a piece of each unit to provide a face 51, FIGURE 6, and then welding the two units in face-to-face relationship as indicated by the line 52. The plane of the face-to-face weld 52 passes through the center point of the track intersection. It should also be noted that each cam unit is cut so that the face 51 thereof is located at what would be a point of reversal of direction in a single unit cam.

Drive means are provided to rotate the shaft 10 and mandrel 12, and also the cam 48. These drive means may be in the form of an electric motor 53 or equivalent power source through a belt and pulley assembly, generally indicated by numeral 54, or the equivalent, connected between the motor and the shaft 10. The drive is transferred to the cam 49 by way of a gear box 55 so that the speed of the cam is proportioned to the speed of the mandrel.

In FIGURE 7 we have shown diagrammatically a triple-unit helical barrel cam, generally indicated by numeral 56 and made up of sections 56a, 56b, and 56c, with adjacent sections faced as above described and welded together at points 57 and 58. This cam, of course, assuming each unit to be of the same size will make a filter unit 50% longer than the cam seen in FIGURE 1.

The roving 2 is delivered from a supply spool 59 through a spring biased tensioning assembly 60, over the arcuate member 28, and through the notch of the roving guide to the filter unit being wound.

With reference now particularly to FIGURE 4, it will be seen that where the cam track 49 intersects, if nothing else was present, there would be a moment when the cam rider 47 would not be in contact with any track wall, and there would be danger of bumping, jamming, or the rider being within the same portion of the track it had already followed. In order to eliminate any such possibility, and permit smooth operation at all times, we have provided an automatically operable cam gate 61 having side walls parallel to the wall of the cam groove. At one end thereof the gate 61 is provided with a pair of outwardly flaring trip wings 62 and 63 which contact the cam rider successively in order to throw the gate to alternate positions. To accommodate the gate and the wings thereon, the walls of the cam groove 49 are provided with slots 64, 65, 66 and 67 adjacent the intersection. The gate is maintained in position by means of a pivot pin 68 fixed to the gate. This pin extends upwardly through the gate and the upper portion thereof extends upwardly through the adjacent cam groove wall above the slot therein and in the plane of the face-to-face weld 52. Below the gate, the pin 68 has a lateral extension 69 paralleling the axis of the gate, and then turns downwardly as indicated at 70, the portions 69 and 70 of the pin being disposed below the underface of the cam. Beneath the cam, a spring 71 has one end attached to the portion 70 of the pivot pin and the other end attached to a fixed pin 72 depending from the underside of the cam in the plane of the weld 52. It should also be noted that each wing on the gate has a sloping edge 73 terminating in a short edge 74 at an obtuse angle thereto, which edges contact the rider 47 during rotation of the cam.

As stated above, as viewed in FIGURE 4, the cam groove of unit 48a has just passed beyond the rider 47 and the cam groove in unit 48b is about to receive the rider. At this point, the gate 61 provides a wall across the intersection for contacting the rider causing a smooth reception of the rider by the groove in unit 48b of the cam. The gate is maintained in its position by means of the spring 71 which will be on the left side of the pivot pin 68, an offcenter position, so that it will retain the cam in its setting. FIGURE 8 shows the cam as having rotated a slightly greater extent in the direction of the arrow 50 and the rider now contacts the edge 73 of the wing 63 which extends across the cam groove in the unit 48b, and the gate 61 has begun to change position. As the cam continues to rotate, the cam will have pivoted the gate and ultimately contacted the straight edge portion 74 which pivots the cam to the point where the spring is on the opposite side of the pivot pin 68 and the spring will snap the gate to the position of FIGURE 9, across the intersection point of the groove that has just received the cam in unit 48b. The gate is thereby in position to provide a bearing wall for the cam when it leaves the groove of unit 48b and again enters the groove of unit 48a whereupon, the wing 62 contacting the cam in the above manner will throw the gate again to the position of FIGURE 4. There is, therefore, no possibility of injury as jamming, bumping, or the reception of the cam by the wrong groove section.

In the event the triple unit cam of FIGURE 7 is utilized, there would be a gate assembly adjacent each intersection point which would be at the welds 57 and 58.

In operation, the instant invention is extremely simple and highly efficient. The strand of roving 2 passes through the tensioning assembly 60 and through the groove in the roving guide, and the end thereof is removably connected to the mandrel at one end of the filter to be formed, by taking a few turns around the mandrel or in any other suitable manner. Then the machine is started, and the roving under proper tension is fed to the mandrel and helically wound therearound by the reciprocatory movement of the roving guide backwardly and forwardly alongside the mandrel. Assuming that one unit of the multi-unit barrel cam 48 is capable of reciprocating the roving guide over a path 15 inches in length, then the entire cam 48 is capable of reciprocating the roving guide back and forth on a path 30 inches in length, and thereby produce a tubular helical wound filter element 30 inches long and of practical uniform density and diameter throughout. As stated above, two revolutions of a dual unit helical cam as seen in FIGURE 1 are necessary to move the roving guide in one direction the full length and return of the filter unit being formed. During that motion the cam rider must follow the track in one cam unit and then shift into the track in the connected cam unit. This is readily accomplished by means of the gate 61, and the gate is automatically adjusted by contact with the cam rider, so that the rider will easily and positively be received by the track in the first cam unit upon the return reciprocatory movement. Under the same length assumption, a cam made in accordance with the showing of FIGURE 7 would produce a filter element 45 inches in length. Thus, the instant invention results in the use of a single roving guide and roving from a single supply to produce a filter element of the character described herein which is much longer than elements of similar structure heretofore produced.

It will be understood that modifications and variations may be effected without departing from the scope of the novel concepts of the present invention.

We claim as our invention:

1. In a winding machine having a winding mandrel, a winding guide, a pivotal support for said guide accomodating swinging movement of the guide toward and away from the axis of the mandrel, a helical barrel cam reciprocating said guide along the length of the mandrel, said cam having a track with a cross-over intersection, said track having side walls with slots therein in the area of the intersection, a rider in said track connected to said guide member for reciprocating the guide member along the length of the mandrel as the cam is rotated, a gate providing a wall across the intersection for contacting the rider to provide a smooth reception of the rider across the intersection, outwardly flaring trip wings on said gate extending through said slots and into the track, said trip wings adapted to be engaged by said rider after it passes the intersection to close the gate for one track and open the gate for the intersecting track, and a toggle spring attached to said gate for snapping the gate between alternate intersection closing positions.

2. A machine to wind roving into an elongated tubular filter element comprising, a plurality of upright supports, a first horizontal axis passing through said supports, a mandrel coaxial with said first axis, a second axis passing through said supports, an elongated bar being remote from, parallel to and rotatable about said second axis, said bar having fixedly attached thereto an inverted T-shaped guide bar, said guide bar having a groove extending along the length thereof, a guide member having a portion thereof in said groove and a retroverted upper end slidably engaging the T bar, said guide member having a roving guide attached thereto to rotate said elongated bar as said filter element is wound, a helical continuous barrel cam having a track therein rotatably mounted on a shaft coaxial with said second axis whereby said cam rotates about said second axis, said track having vertical side walls and a horizontal bottom, a connecting rod on said elongated bar attached at one end to said guide member and having a rider on the opposite end thereof said rider depending into said track whereby as said cam rotates, said rider, connecting rod and guide means reciprocate a distance substantially equal to the length of said mandrel.

3. In a machine to wind roving according to claim 2 wherein said track has the configuration of a cylindrically wrapped FIGURE 8, an automatically operable cam gate at the cross-over intersection of said FIGURE 8 having side walls parallel to the wall of the cam groove, said track side walls having slots therein, said cam gate being pivotally mounted in said slots, said cam gate being generally T-shaped in configuration with said T cross member being a pair of outwardly flaring trip wings, said trip wings extending into said track so that as said rider crosses said intersection on said gate wall it closes the gate for that track and opens the gate for the intersecting track, said gate having an over-center resilient spring means thereon so that after said rider urges said gate flare tip over center said resilient means snaps said gate into position for the return of the rider on the intersection track.

References Cited

UNITED STATES PATENTS

| | | | |
|---|---|---|---|
| 786,862 | 4/1905 | Wardwell | 242—26 |
| 827,130 | 7/1906 | Wardwell | 242—43 X |
| 895,455 | 8/1908 | Hansen | 242—26 |
| 2,328,344 | 8/1943 | Jones | 242—43 X |
| 3,193,209 | 7/1965 | Hambach | 242—18 |

FOREIGN PATENTS

| | | |
|---|---|---|
| 422,401 | 12/1925 | Germany. |
| 953,864 | 12/1956 | Germany. |
| 2,437 | 1911 | Great Britain. |
| 341,118 | 1/1931 | Great Britain. |

STANLEY N. GILREATH, *Primary Examiner.*